United States Patent [19]

Kaminaga et al.

[11] Patent Number: 5,248,881
[45] Date of Patent: Sep. 28, 1993

[54] OPTICAL FIBER TYPE DEVICE FOR MONITORING A MOVING OBJECT TO DETECT A ROTATIONAL POSITION OF AN INTERNAL COMBUSTION ENGINE

[75] Inventors: Toshiaki Kaminaga, Ibaraki; Kenichi Katagishi, Katsuta; Takenari Yoshida, Ibaraki; Masaaki Kusano; Junichi Shimizu, both of Yokohama; Kazuya Yuzawa, Katsuta, all of Japan

[73] Assignees: Hitachi, Ltd., Tokyo; Hitachi Automotive Engineering Co., Ltd., Ibaraki, both of Japan

[21] Appl. No.: 672,442

[22] Filed: Mar. 20, 1991

[30] Foreign Application Priority Data

Mar. 28, 1990 [JP] Japan .................. 2-76884

[51] Int. Cl.$^5$ ..................... H01J 5/16; G02B 6/36
[52] U.S. Cl. .................. 250/227.21; 250/227.24; 385/80
[58] Field of Search .............. 250/227.21, 227.24; 385/80

[56] References Cited

U.S. PATENT DOCUMENTS

| | | | |
|---|---|---|---|
| 3,655,275 | 4/1972 | Seagreaves | 385/80 |
| 3,947,182 | 3/1976 | McCartney | 385/80 |
| 4,687,927 | 8/1987 | Iwamoto et al. | 250/227.21 |
| 4,691,987 | 9/1987 | Ebner et al. | 250/227.24 |
| 4,761,051 | 8/1988 | Crespo Ruiz et al. | 385/80 |
| 4,767,164 | 8/1988 | Yeung | 250/227.21 |
| 4,803,361 | 2/1989 | Aiki et al. | 250/227.24 |
| 4,832,441 | 5/1989 | Barnes et al. | 385/109 |
| 5,015,056 | 5/1991 | Yamaguchi et al. | 250/227.21 |

*Primary Examiner*—Constantine Hannaher
*Assistant Examiner*—Kiet T. Nguyen
*Attorney, Agent, or Firm*—Antonelli, Terry, Stout & Kraus

[57] ABSTRACT

The present invention relates to a device for optically monitoring or detecting information regarding a moving object by using optical fibers. The object of the invention is to prevent output characteristics from deteriorating with the passage of time. This deterioration is caused by the fact that a resin-made holder of a detecting section is deformed or a position in which the holder is installed shifts particularly because of heat and vibrations. An intermediate member is disposed between the holder and a fixing member. The holder is secured to the intermediate member which is used as a member for absorbing heat and vibrations.

22 Claims, 14 Drawing Sheets

OPTICAL FIBER TYPE DEVICE FOR MONITORING A MOVING OBJECT TO DETECT A ROTATIONAL POSITION OF AN INTERNAL COMBUSTION ENGINE

BACKGROUND OF THE INVENTION

The present invention relates to a device for optically monitoring or detecting information regarding a moving object and, more particularly, to a device using optical fibers for optically monitoring or detecting information regarding a moving object.

In the optical type device for monitoring a moving object disclosed in Japanese Patent Laid-Open No. 60-159656 and 62-67409, a holder affixed to an end of an optical fiber is directly installed on the wall of a container for holding a moving object to be monitored.

The above conventional optical fiber type device for monitoring a moving object does not take into consideration the environment in which it is used. "The installation posture" of the holder changes with the passage of time because of heat and vibration from the container for holding the holder. As a result, the distance between the device and a moving object to be monitored, and the position in which the device is installed, shift. This leads to a problem in that it is impossible to obtain an accurate light signal output.

Such a problem becomes pronounced especially when the device is utilized near an internal combustion engine or a turbine.

SUMMARY OF THE INVENTION

An object of the present invention is therefore to provide an optical fiber type device for monitoring a moving object, which eliminates the above problem of the conventional art. This device is capable of providing, without being affected by the environment in which it is used, an accurate light signal output over long periods of time.

Another object of the invention is to provide an optical fiber type device for detecting a rotational position, which device may be disposed near an internal combustion engine or a turbine, and is suitably used for detecting the rotational position of a rotation shaft.

To achieve the objects mentioned above, this invention provides an optical fiber type device for monitoring a moving object wherein, when a holder at the end of an optical fiber is installed in a container for holding a moving object to be monitored, an intermediate member acting as a retaining member is provided between the holder and the container. The holder is secured to this intermediate member so as not to come into direct contact with the container.

The intermediate member and the holder are composed of members whose respective thermal expansion coefficients are substantially the same.

In accordance with the optical fiber type device for monitoring a moving object as constructed above, since the holder at the end of the optical fiber is not heated directly by the container for holding a moving object to be monitored, the holder can be formed of a member, such as resin which is not heat-resistant, having good molding characteristics.

Moreover, because vibrations from the holder are absorbed by the intermediate member, the optical fiber will not be cracked, nor will the holder be damaged.

In addition, the thermal expansion coefficient of the intermediate member and that of the holder are substantially the same, so that the difference between the thermal expansion of the container and that of the holder can be absorbed by the intermediate member. Thus, the holder will not be deformed or damaged by such a difference.

BRIEF DESCRIPTION OF THE DRAWINGS

FIGS. 3 through 8 are cross-sectional views showing the connection of optical fibers; wherein

DESCRIPTION OF THE PREFERRED EMBODIMENTS

The embodiments of the present invention will be described below with reference to FIGS. 1-19.

Figure 1:
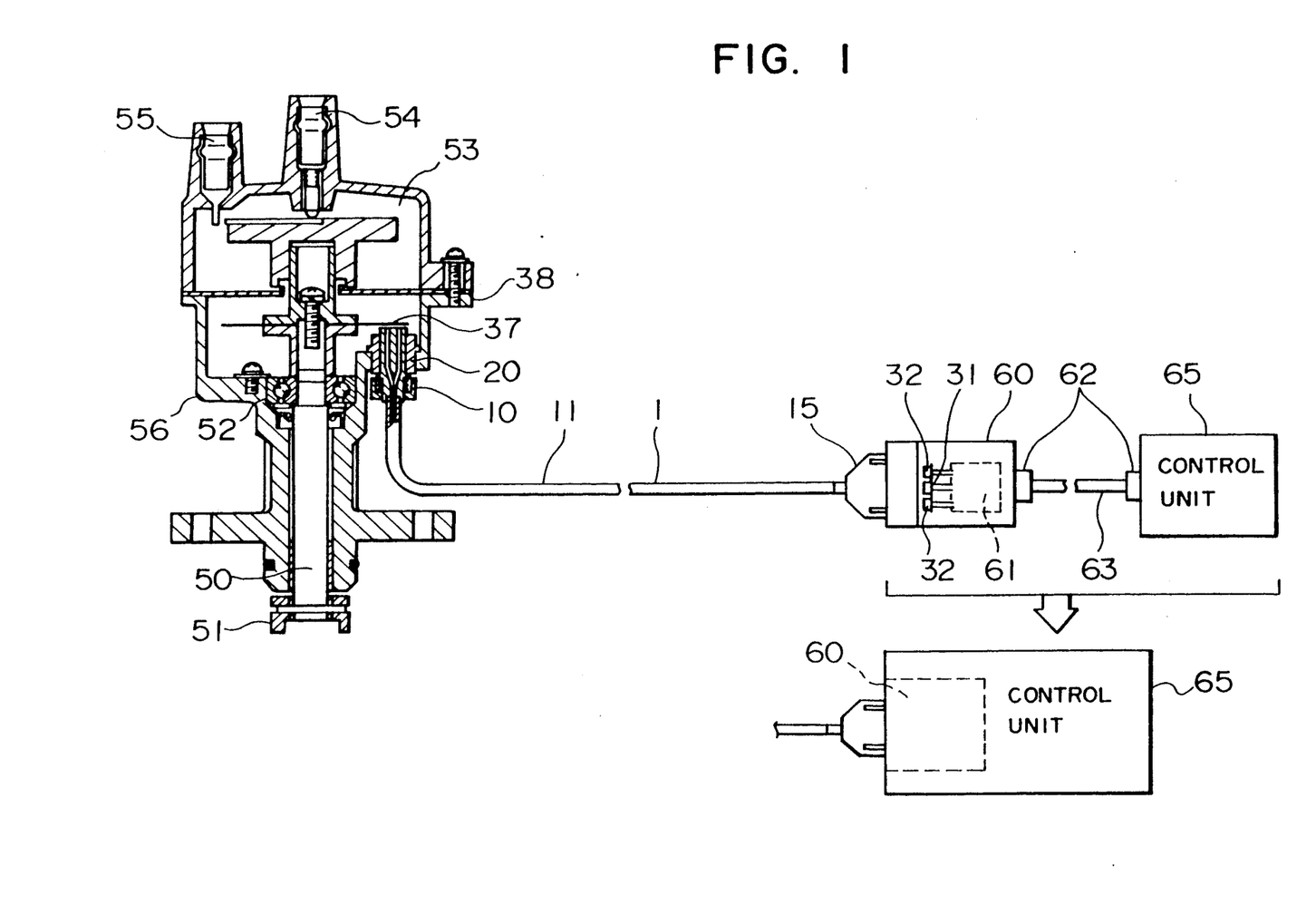
FIG. 1 is a schematic cross-sectional view showing a rotation angle detecting system used for an internal combustion engine in accordance with the present invention.

FIG. 1 is a view showing this invention which is a rotation angle detecting system for an internal combustion engine.

A shaft 50 of a distributor 38 is connected via a coupling 51 to be driven by the rotation shaft of an engine, and rotates while it is supported by a bearing 52. A rotor head 53, for distributing electricity from a center electrode 54 to side electrodes 55, is attached to the shaft 50. A rotor plate 37 is also attached to this shaft 50. A receptacle 20 is fitted into a housing 56 so as to face the rotor plate 37.

An optical connector assembly 1 is composed of an optical fiber cable 11, an optical connector 15, and a sensor head connector 10 made of a resin material and connected to the receptacle 20, which is also formed of a resin material having substantially the same coefficient of expansion.

The optical connector 15 is connected to an optical amplifying module 60 in which a light emitting means 31 and light receiving means 32 are both connected to optical fibers. Light is converted into an electrical signal by the light receiving means 32, and the converted electrical signal is then shaped by a waveform shaping circuit 61. The output signal which has been digitized is transmitted to an engine control unit 65 through electrical connectors 62 and an electrical harness 63.

In the engine control unit 65, this output signal is used for controlling ignition timing for the engine, time during which fuel is injected, and the like.

If the optical amplifying module 60 is incorporated in the engine control unit 65, the electrical harness 63 and other components may not be necessary.

The optical connector 15 and other components shown on the right of this connector 15 are arranged in a noise-free engine compartment or the like.

The thus-constructed rotation angle detecting system according to the invention makes it possible to detect rotation angles in which heat, noise, and NOx resistances are improved.

Figures 2A, 2B, 2F:
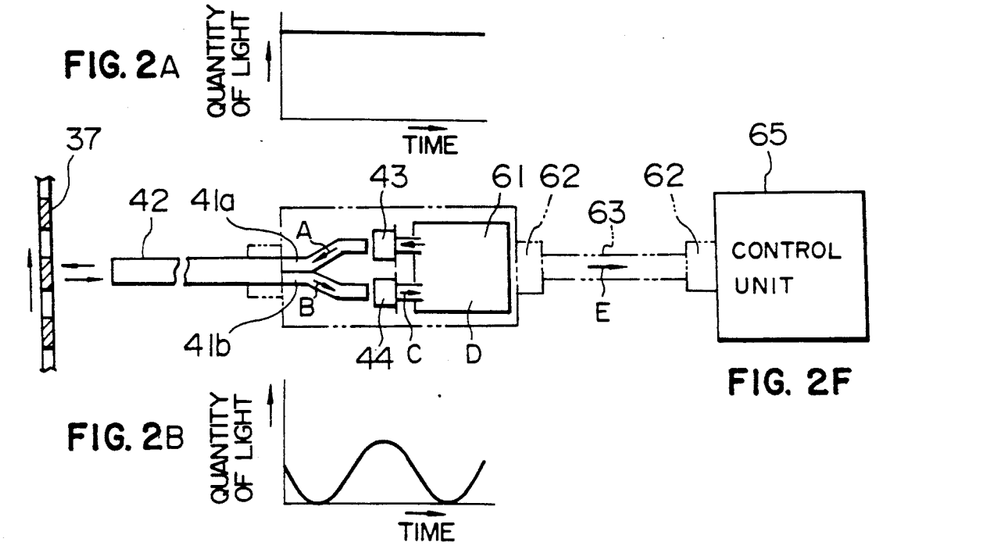
FIGS. 2A-2F are views showing the operational principles of the system.

FIG. 2F is a view showing the operational principles of the system.

Figure 2C:
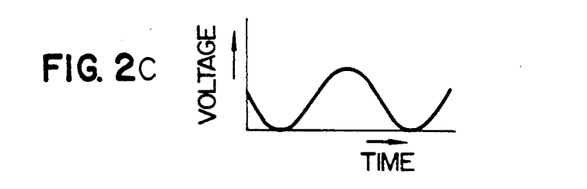
Figure 2D:
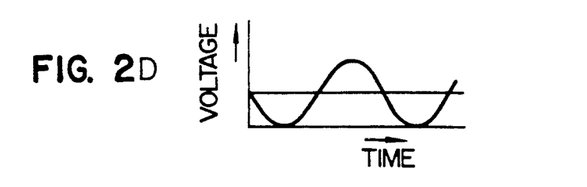
Figure 2E:
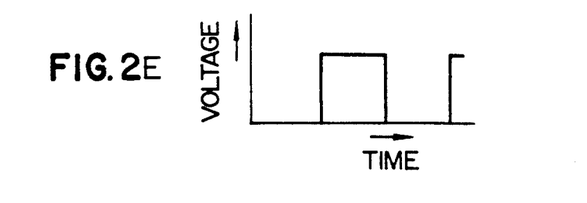

A light emitting means 43 in the optical amplifying module 60 projects a fixed quantity of light onto an optical fiber 41a (FIG. 2A). The light is transmitted from the optical fiber 41a to one end of an optical fiber 42, and is then output from the other end of the optical fiber 42. The output light is interrupted by a light interrupting means 37, and reflected light is then received by the optical fiber 42 for further transmission to an optical fiber 41b (FIG. 2B). It is received by a light receiving means 44, and is then converted into electricity (FIG. 2C). The electrical signal which is output from the light receiving means 44 is compared by the waveform shaping circuit 61 (FIG. 2D), and is then converted into a digitized signal (FIG. 2E) for further transmission to the engine control unit 65.

FIGS. 3 through 8 each illustrate the connection of optical fibers to each other.

Figure 3:
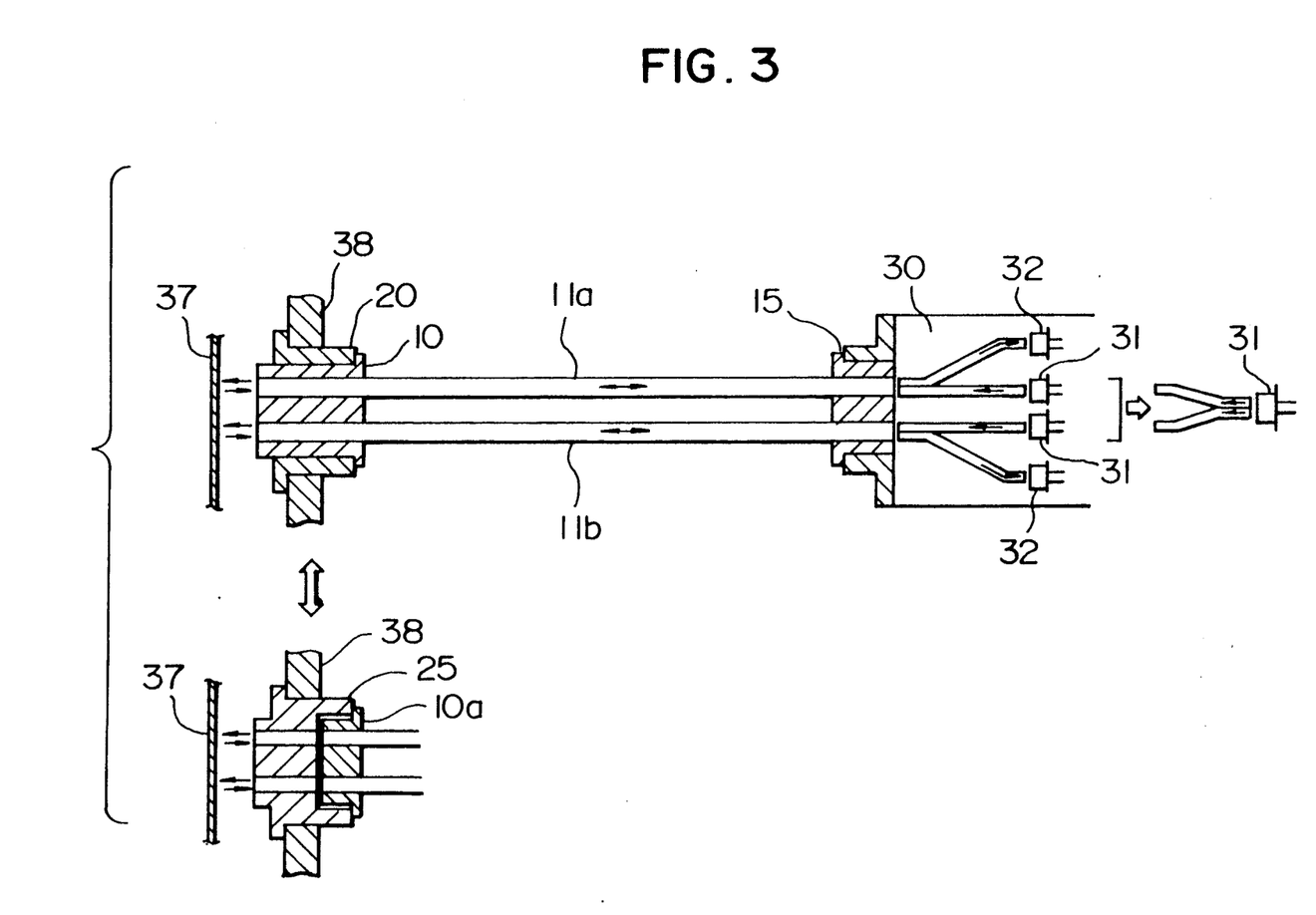
FIG. 3 is a cross-sectional view showing the connection which employs a single core/two-way light transmission mode and reflection mode light sensing.
Figure 4:
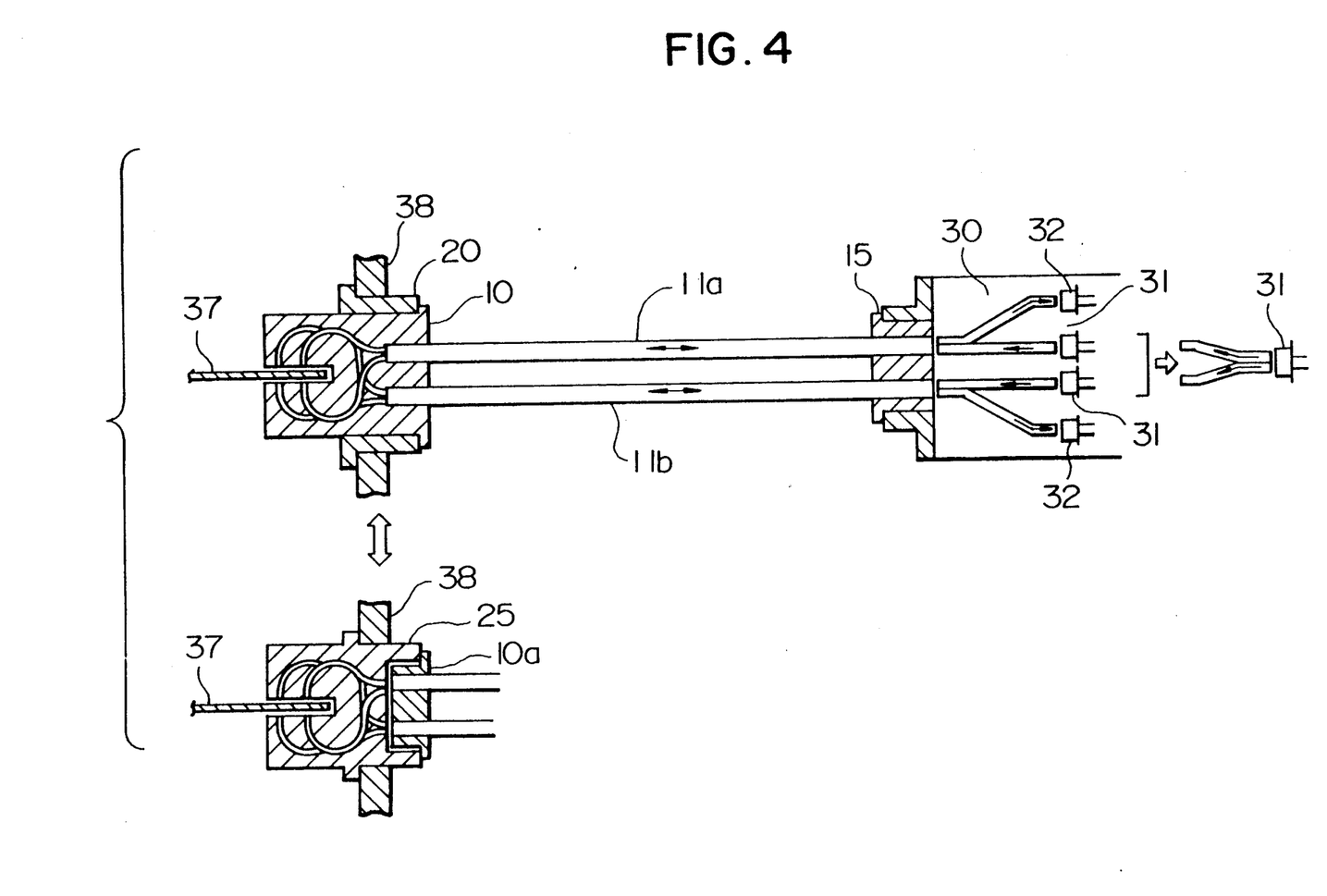
FIG. 4 is a cross-sectional view showing the connection which employs the single core/two-way light transmission mode and transmitting mode light sensing.

FIGS. 3 and 4 each show embodiments employing a single core optical fiber cable for two-way light transmission.

A reflection mode is employed in an optical sensing in FIG. 3. Light being output from the light emitting means 31 is projected onto transmitting fibers 11a and 11b by means of fibers in a light branching section 30. The light which has been output from the ends of the transmitting fibers 11a and 11b is reflected from the rotor plate 37. The interrupted light which has been reflected is received by the transmitting fibers 11a and 11b, and is then led to the light receiving elements 32 in the light branching section 30. There are two types of sensing sections. One type is a sensing section in which an optical connector and a sensing head are integrally constructed together. The other type is a sensing section in which an optical connector and a sensing head are separately constructed. With the use of a branching fiber, it is possible to use one light emitting element, instead of two light emitting elements.

A transmitting mode is employed in the optical sensing in FIG. 4. As compared with the reflection mode, the transmitting mode is advantageous in that the rotor plate 37 is less likely to become soiled, and less light is lost.

In the embodiments shown in FIGS. 3 and 4, when the distance between the sensing section and the light emitting/light receiving elements is long, it is possible to reduce the number of optical fibers used. This is an advantage of these embodiments in terms of costs.

Figure 5:
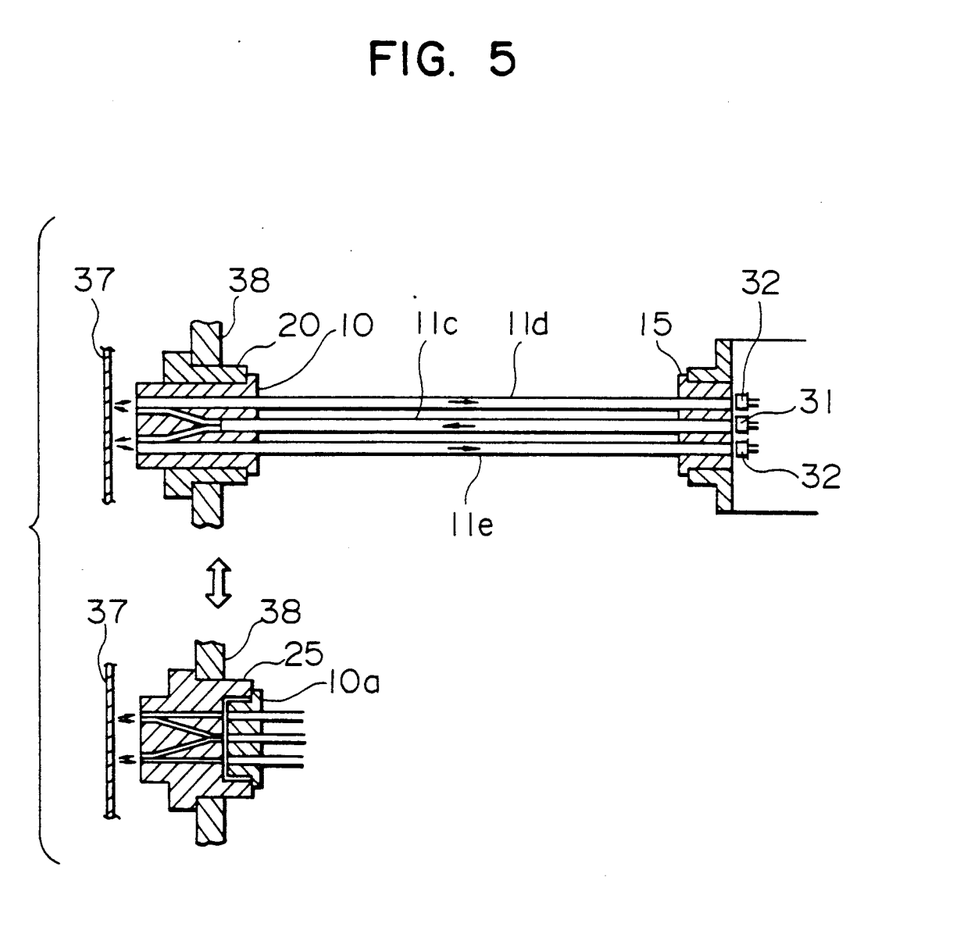
FIG. 5 is a cross-sectional view illustrating the connection where one light emitting fiber, two light receiving fibers, and the reflection mode light sensing are employed.
Figure 6:
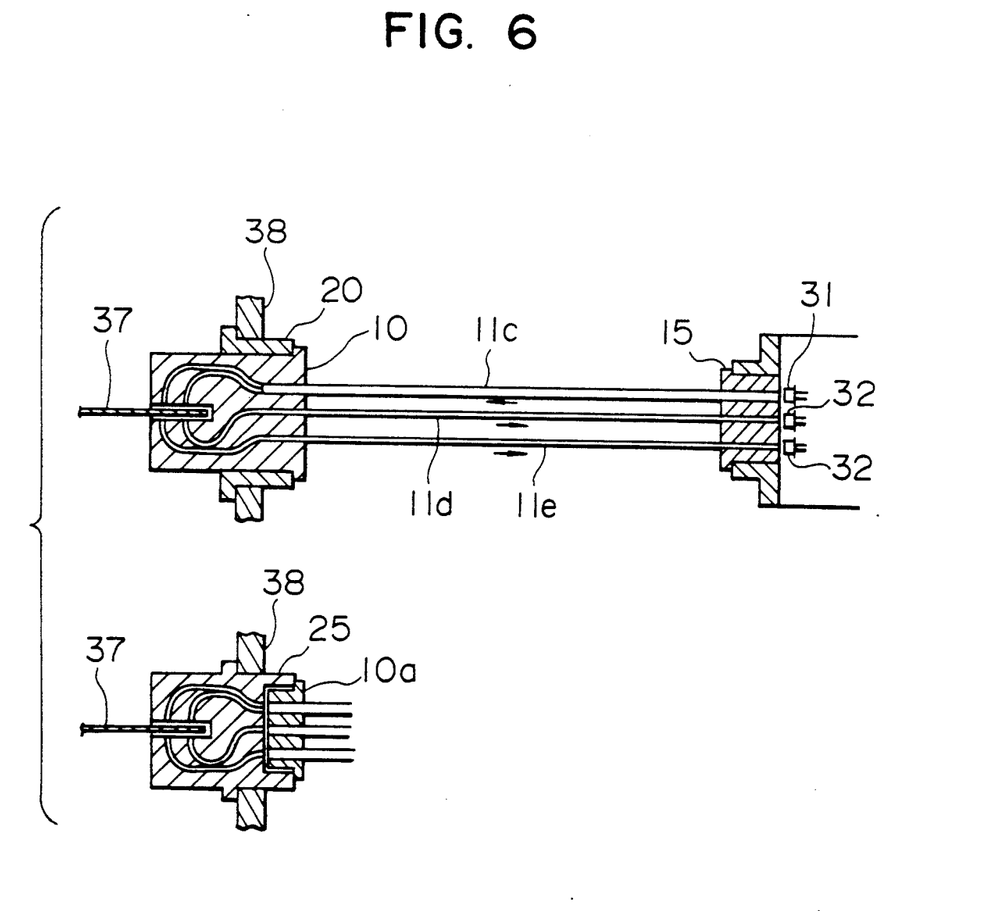
FIG. 6 is a cross-sectional view illustrating the connection where one light emitting fiber, two light receiving fibers, and the transmitting mode light sensing are employed.

FIGS. 5 and 6 show embodiments which employ an optical fiber cable using one light emitting fiber and two light receiving fibers.

A reflection mode is employed in the optical sensing in FIG. 5.

Light is transmitted from the light emitting element 31 to a light emitting fiber 11c, and is then branched at the sensing section for projection onto the rotor plate 37. The projected light is interrupted by the rotor plate 37, and is then received by light receiving fibers 11d and 11e.

A transmitting mode is employed in the optical sensing in FIG. 6.

The embodiments in FIGS. 5 and 6 have an advantage in that the provision of fibers exclusively used for receiving light makes it possible to reduce the loss of received light during transmission.

Figure 7:
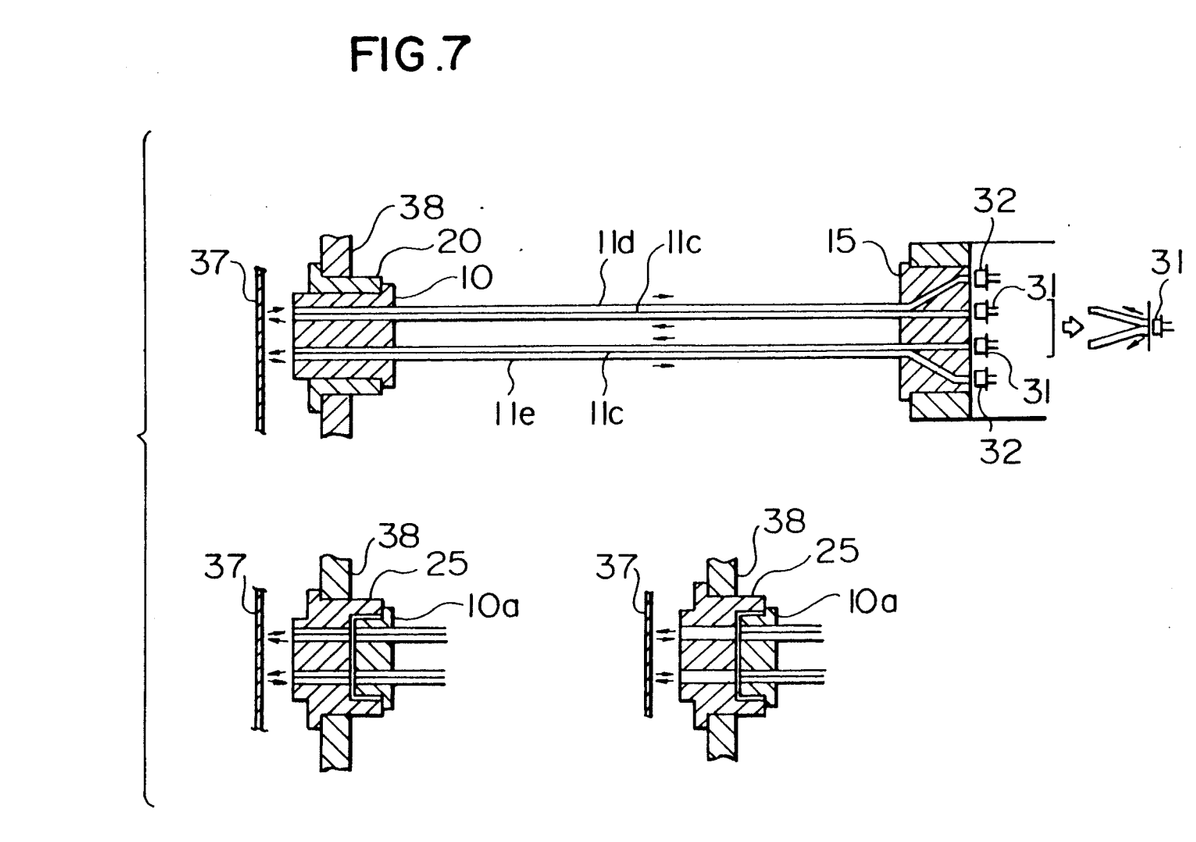
FIG. 7 is a cross-sectional view illustrating the connection where two light emitting and two light receiving optical fibers are used in an optical fiber cable, and where the reflection mode light sensing is also used.
Figure 8:
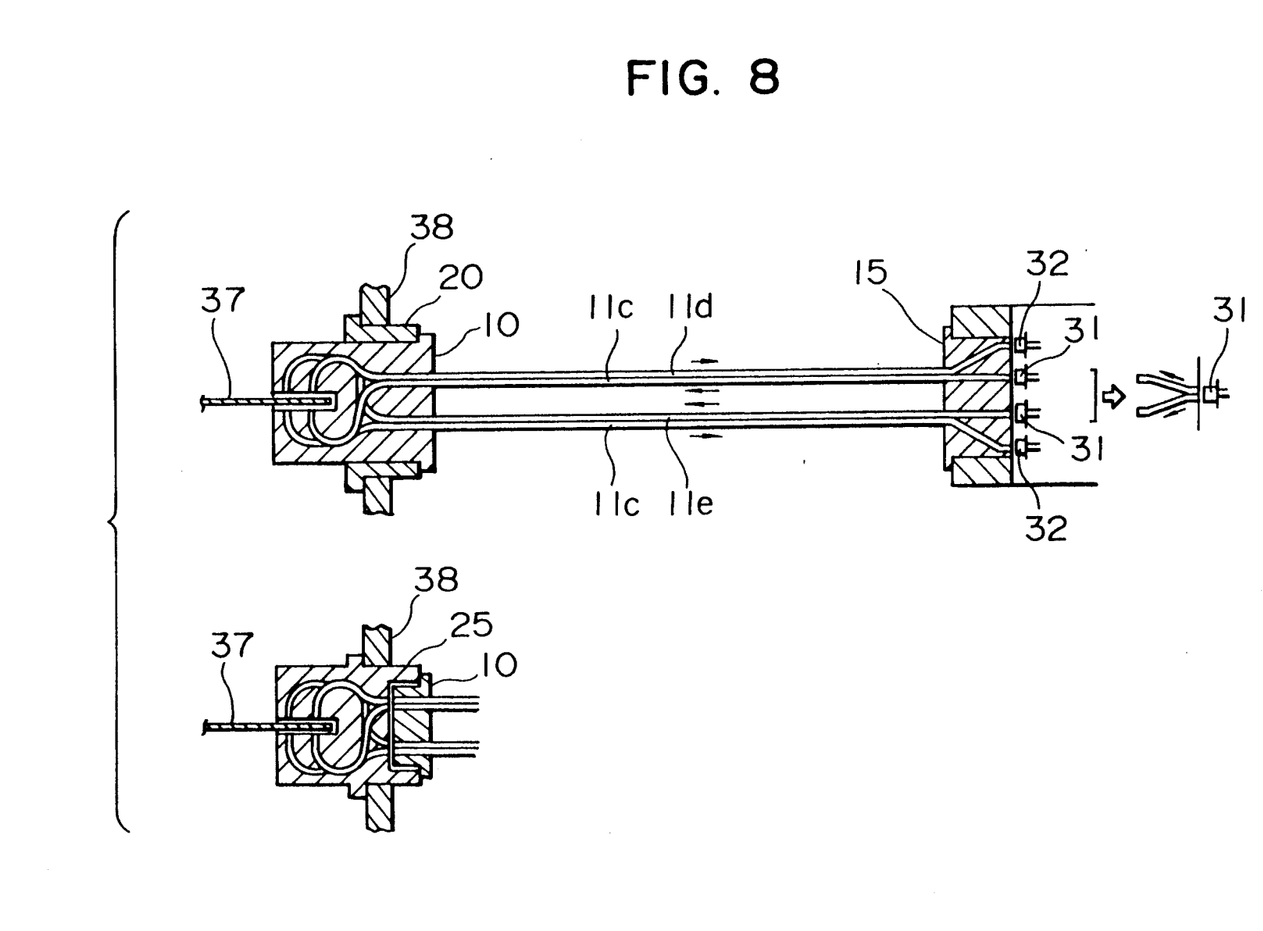
FIG. 8 is a cross-sectional view illustrating the connection where two light emitting and two light receiving optical fibers are used in an optical fiber cable, and where the transmitting mode light sensing is also used.

FIGS. 7 and 8 each illustrate embodiments in which two optical fibers for emitting light and two optical fibers for receiving light are used in an optical fiber cable.

A reflection mode is employed in the optical sensing in FIG. 7. Light emanated from the light emitting elements 31 is transmitted through light emitting fibers, thus being projected onto the rotor plate 37. The light interrupted by the rotor plate 37 is received by light receiving fibers for further transmission to the light receiving elements 32. There are two types of sensing sections. In one type an optical connector and a sensing head are integrally constructed together; and in the other type an optical connector and a sensing head are separately constructed. The latter type of separate construction can be further divided into two types. One type uses four optical fibers in a sensing head, whereas the other type uses two optical fibers with a large diameter in the sensing head.

A transmitting mode is employed in the optical sensing in FIG. 8.

The embodiments in FIGS. 7 and 8 have an advantage in that the provision of fibers used exclusively for emitting or receiving light makes it possible to reduce the loss of received light during transmission.

Figure 9:
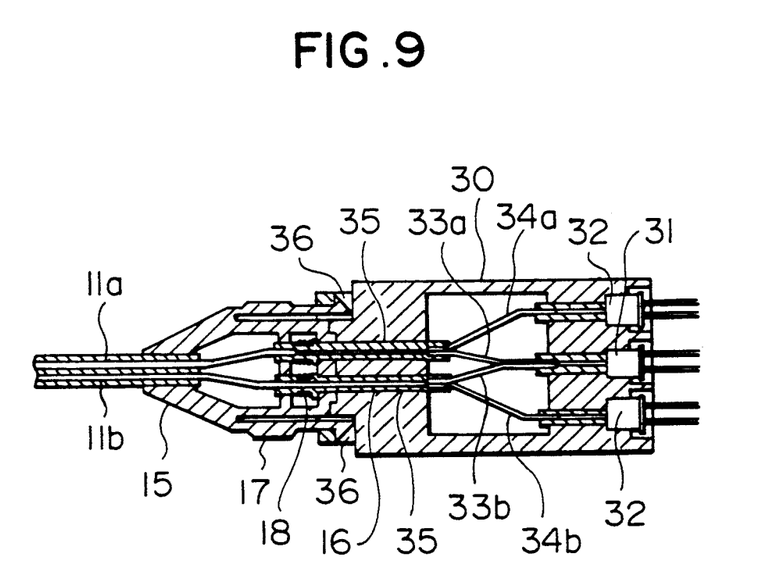
FIG. 9 is a cross-sectional view showing in detail the connection of optical fibers in the case of the single core/two-way light transmission mode.
Figure 10:
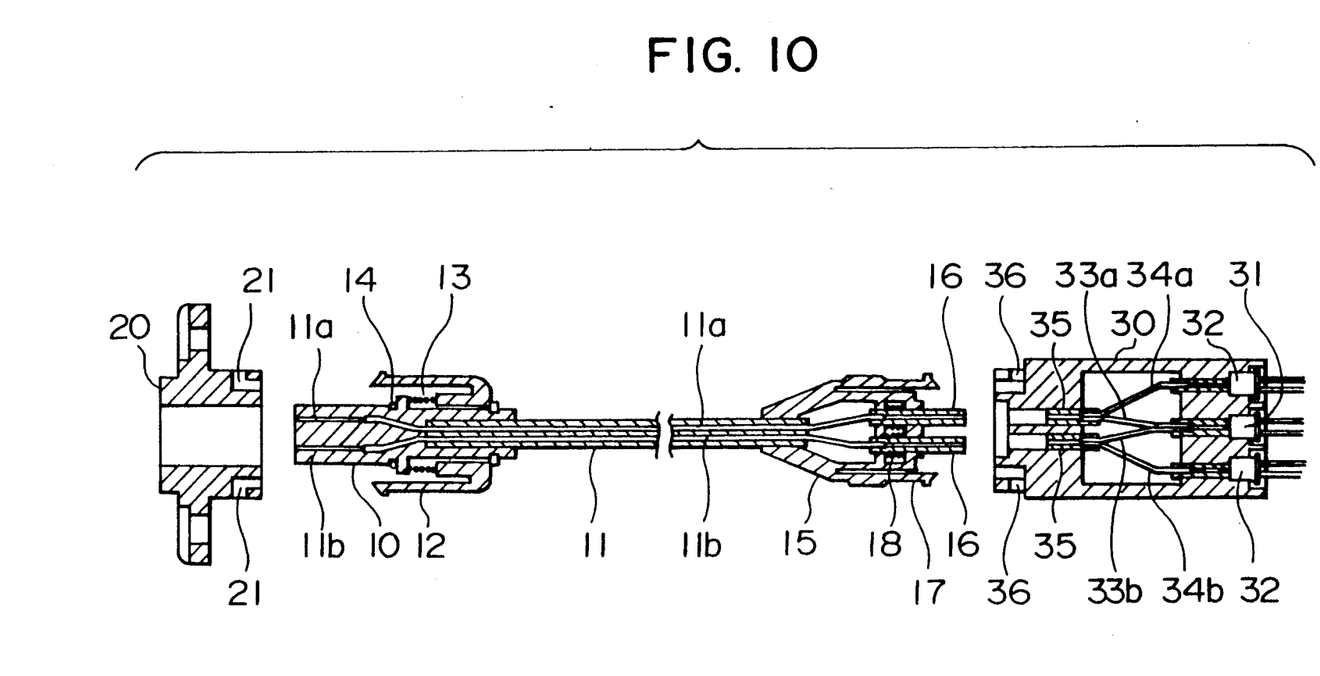
FIG. 10 is a cross-sectional view showing the connection of optical fibers according to another embodiment in the case of the single core/two-way light transmission mode.

FIGS. 9 and 10 show in detail the connection of single core optical fibers to each other when light is transmitted two ways.

The optical connector assembly 1 is composed of the sensor head connector 10, the optical fiber cable 11, and a two-core optical connector 15.

Numeral 20 denotes the receptacle attached to the distributor so as to face the rotor plate 37.

The sensor head connector 10 is connected to the receptacle 20. Numeral 12 denotes a lock lever which is locked by a locking section 21 of the receptacle 20. Numeral 13 denotes a spool which not only maintains the sensor head connector 10 in a locked position, but also provides pressure to maintain a constant gap between the front end of a sensor head and the rotor plate 37. Numeral 14 denotes a seal for preventing the intrusion of oil, water, dust, and the like.

In the above way, the sensing section takes the shape of a connector, the "one-touch" mounting improving its installation capability.

Numeral 16 designates ferrules of a two-core connector connected to branching ferrules 35 of a light branching module. Numeral 17 designates a lock lever locked by a locking section 36 of the light branching module. Numeral 18 designates springs used for maintaining the locking section 36 and for providing pressure to the ferrules 16.

Numeral 31 designates the light emitting element, and numeral 32 designates the light receiving elements. Numerals 33a, 33b, 34a, and 34b designate branching optical fibers, and numeral 35 designates the branching ferrules.

Light from the light emitting element 31 is split into two, paths that is, into the optical fibers 33a and 33b. Light which goes into the optical fiber 33a is transmitted from the ferrule 35 to the ferrule 16. It is then projected onto the rotor plate 37 from the end of the sensor head connector 10 after being passed through the transmitting fiber 11a. The light reflected from the rotor plate 37 impinges again on the transmitting fiber 11a, passing through the branching fiber 34a from the ferrule 16. It is then received by the light receiving element 32, and is converted into electricity. Light which goes into the optical fiber 33b follows the same path as described above. A two-channel light signal can thus be detected.

A two-channel pulse signal can be obtained, if on the rotor plate 37, for example, either there is a black and white pattern, or slits are arranged at fixed intervals.

FIGS. 11 through 19 show in detail a sensing section which can be applied to single-core and two-way optical fibers used in the embodiments of FIGS. 3 and 4.

First, FIGS. 11 through 14 show a reflection mode sensing section.

Figure 11:
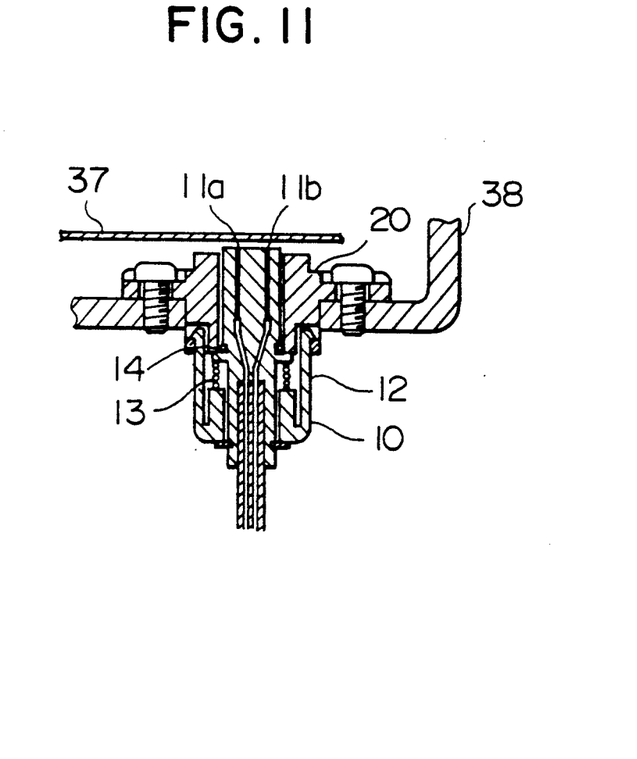
FIGS. 11 through 19 are cross-sectional views showing in detail embodiments that depict sensing sections which are applicable when the single core/two-way optical fiber cables of FIGS. 3 and 4 are employed.

In FIG. 11, the sensing head and the optical connector are integrally constructed together. The sensing section of the sensing head is disposed in the same direction as that of the rotation shaft. This embodiment has the advantage that the optical fiber is not divided in the sensing section. Thereby the loss of light can be reduced.

Figure 12:
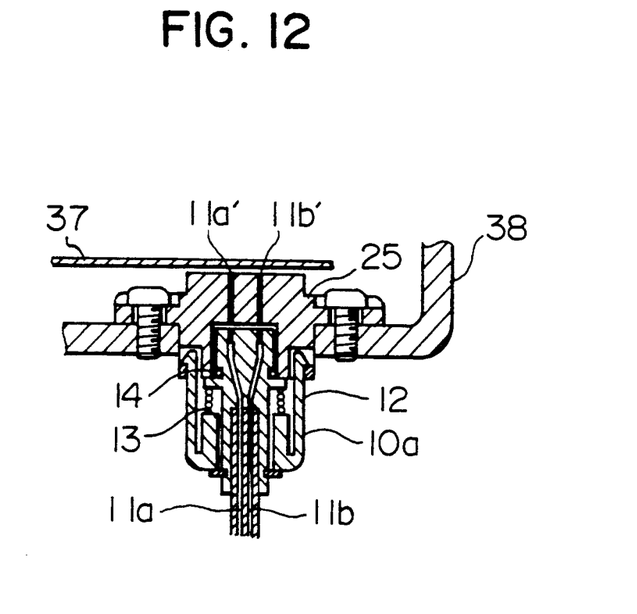

In FIG. 12, the sensing section is disposed in the same direction as that of the rotation shaft in the same manner as in FIG. 11. In this type of sensing section, the sensing head and the optical connector are separated from each other. An advantage of this embodiment is that it is possible to control the distance between a plane, from which light is reflected, and the sensing head. Thus it is possible to reduce the loss of the reflected light.

Figure 13:
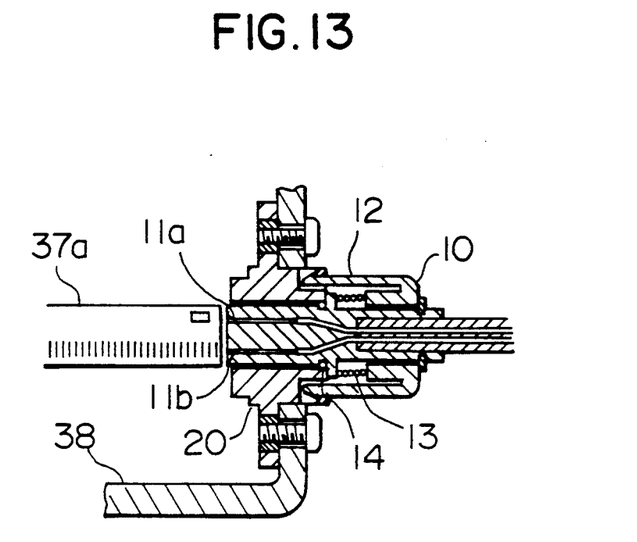
Figure 14:
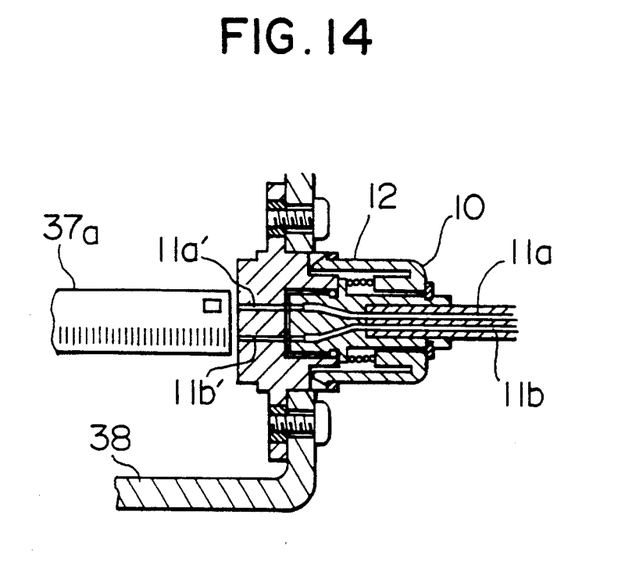

FIGS. 13 and 14 each illustrate a sensing section which is disposed perpendicular to the rotation shaft. A thick rotatable reflecting member is disposed, with light being reflected from the side of this reflecting member.

When there is no allowance for the height of the rotation shaft in the shaft direction, there is no need for the optical fibers to be bent. This is an advantage of this embodiment. The sensing section is thus easily attached. There are two types of sensing sections: one type in which the sensing head and the optical connector are integrally constructed together; and the other type in which the sensing head and the optical connector are separately constructed in the same manner as in FIGS. 11 and 12.

FIGS. 15 through 19 each show a transmitting mode sensing section.

Figure 15:
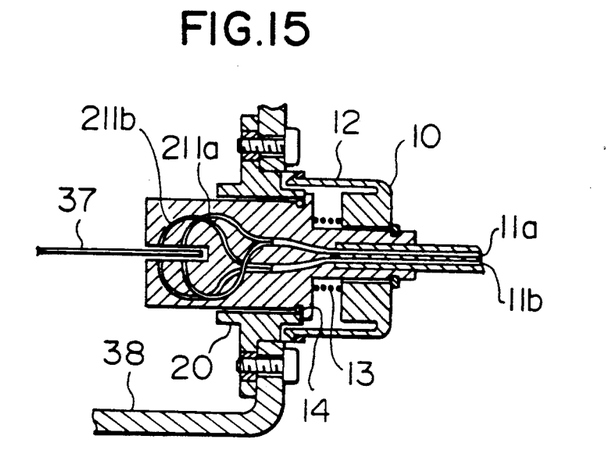

FIG. 15 shows a sensing section in which the sensing head and the optical connector are integrally constructed together.

This embodiment has an advantage in that the optical fiber is not divided in the sensing section. The loss of light ca thus be reduced.

Figure 16:
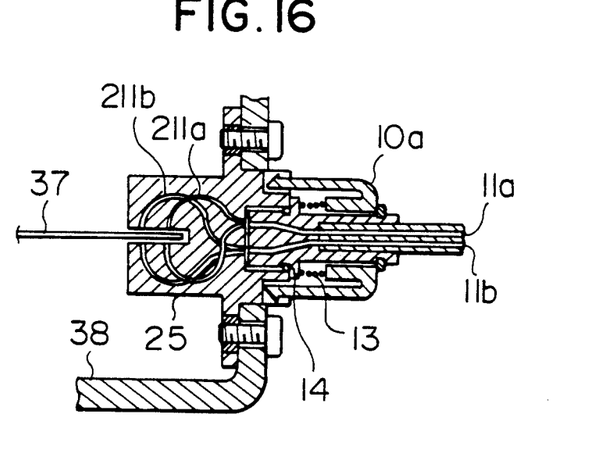

In FIG. 16, a sensing section is shown in which the sensing head and the optical connector are separated.

In this embodiment, a gap and the like can be controlled in the sensing section, and the loss of light can thus be reduced.

Figure 17:
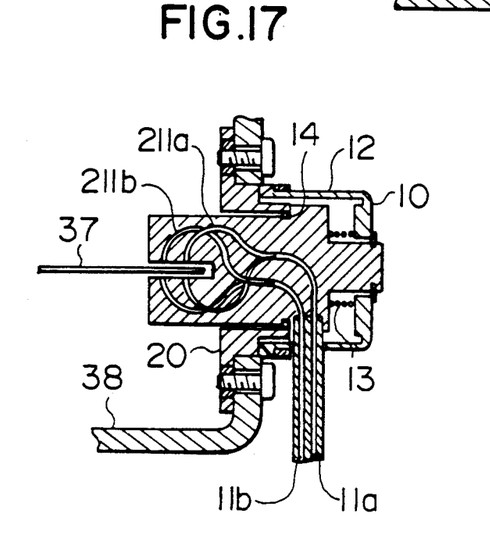

FIG. 17 illustrates a modification of the sensing section shown in FIG. 15. In this modification, the direction in which the optical fiber cable is drawn out differs from that shown in FIG. 15.

Figure 18:
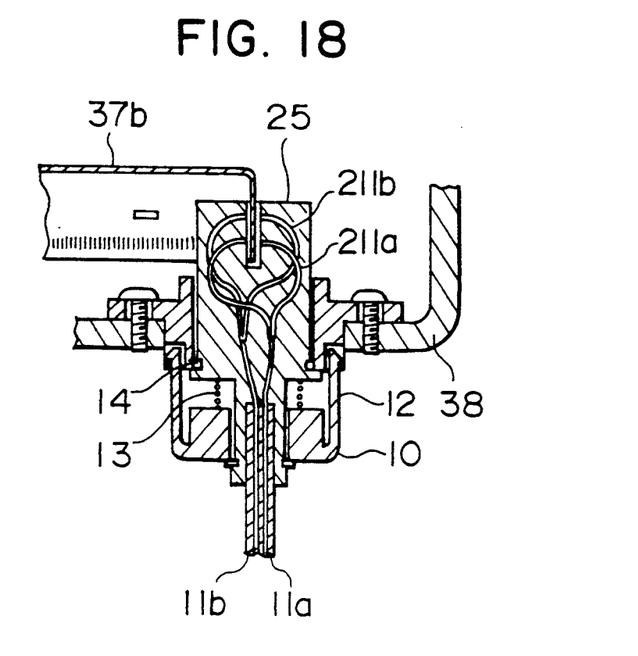
Figure 19:
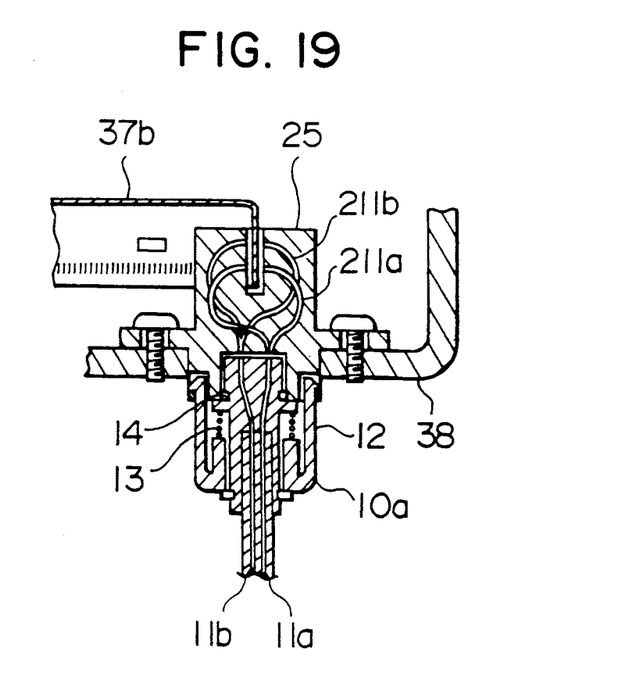

A sensing section shown in FIG. 18 is a modification of the sensing section in FIG. 15, whereas a sensing section shown in FIG. 19 is a modification of the sensing section in FIG. 16. In both of these sensing sections in FIGS. 18 and 19, the directions in which the connectors are disposed differ from those illustrated in FIGS. 15 and 16.

Although distributors are currently manufactured with a photoelectric crank angle sensor, the environment inside these distributors is destructive due to noise, heat, and other factors.

Distributors reach a high temperature of about 130° C. Because of the trend toward smaller engine compartments in recent years, the maximum temperature is likely to increase. The temperature at which electronic components, such as light emitting and light receiving elements and the like, are warranted is about 130° C. at the highest, thereby making it impossible to incorporate electronic components in the distributor.

Furthermore, since the distributor distributes high voltage for ignition, a great deal of noises are generated. Noise reduction has become an important problem with respect to a unit of the built-in electronic components, with a goal of preventing these components from malfunctioning. However, since types of noises vary greatly, it is very difficult to take countermeasures against noises to the fullest extent.

Moreover, because electricity is distributed and discharged in the distributor, NOx may be generated which combines with water, producing nitric acid. The nitric acid corrodes the electronic components.

In this way, the effectiveness of the detection of rotation position which is particularly important for engine control, has become limited because the unit of electronic components is built into the distributor.

In accordance with the embodiments of the present arranged outside the distributor. The light emitting and light receiving elements in the unit are connected, by means of the optical fibers, to the light interrupting means built in the distributor. These optical fibers sense the light interrupting means. Heat, noise, and NOx resistances can thus be improved.

In addition, because the optical fiber cable is made in the shape of a connector at both ends, it can be easily connected and installed.

There are many rotation angle detecting devices using optical fibers. However, none of these devices embodies the concept of making the distributor in the shape of a connector as described and disclosed in the embodiments of this invention.

The features of the embodiments are summarized as follows:

To improve noise and heat resistances mentioned above, the electronic components (such as light emitting and light receiving means, and a waveform shaping circuit) are arranged outside the distributor e.g., in a compartment. These electronic components and the distributor are connected to each other by means of optical fibers.

The distributor section is constructed in such a manner that light being output from the optical fibers is interrupted by the rotatable light interrupting means. The interrupted light is received by the optical fibers, and is then transmitted to an electronic circuit.

Furthermore, the distributor and the optical fibers are connected with the pressure connector using springs, thus improving the installation capability of the device.

In the type of sensing section in which the sensing head and the connector are integrally constructed together, the frequency with which the optical fibers become divided is lower, and thereby the loss of light can be reduced. In the type of sensing section in which the sensing head and the connector are separated, the positioning of the sensing section can made with precision, and thereby the loss of light can be reduced.

Moreover, distributors reach a high temperature of about 130° C. because they are attached to engines. This high maximum temperature is likely to increase because of the trend toward small engine compartments. Since the unit of the electronic components, including light emitting and light receiving elements, is disposed outside the distributor, and since the optical fibers are employed not only to sense the light interrupting means inside the distributor, but also to transmit light, it is possible to improve the heat resistance, the solution of which is formerly restricted because of the electronic components.

Although a great deal of electrical noise is generated in the engine compartment, especially because the distributor distributes high voltage for ignition, the unit of the electronic components is not adversely affected by the electrical noise. This is because the optical fibers alone not only perform sensing inside the distributor, but also transmit a signal for this sensing. Also, when the unit of the electronic components disposed outside the distributor is installed, for example, in a noise-free compartment, it is not adversely affected by noise generated in the engine compartment.

It is also possible to solve the problem caused by NOx generated in the distributor which corrodes the electronic components, and make them inoperable.

The present invention makes it possible to detect rotation angles without disposing the electronic components in the distributor, and to increase the heat resistance, the solution of which has been restricted because of the electronic components. The invention has the advantage that the unit of the electronic components is not adversely affected by electrical noise, since the optical fibers perform sensing and transmission of light as well.

In addition, it is possible to solve the problem of corrosion of the electronic components caused by NOx inside the distributor.

In the distributor, because the optical fiber cable is made in the shape of a connector at both ends, it can be easily installed.

According to the present invention, since the fiber head is not affected directly by heat and vibrations from its container, it is possible to provide an optical fiber type device for monitoring a moving object, this device being capable of outputting an accurate light signal output over long periods of time.

What is claimed is:

1. A device for detecting a rotational position of n internal combustion engine, using an optical fiber type device for monitoring a moving object rotated by said internal combustion engine, comprising:
   a housing for holding said moving object to be monitored;
   light intercepting means disposed on said moving object within said housing;
   a retaining member secured to said housing at a predetermined position with respect to said light interception means disposed on said moving object to be monitored;
   a fiber head member coupled to said retaining member for retaining ends of two optical fibers precisely at said predetermined position, one fiber being used for feeding light to said light intercepting means and the other fiber being used for receiving light which has been intercepted by said light intercepting means;
   light feeding and receiving means, including said two fibers, for feeding light to said light intercepting means and for receiving light from said light intercepting means; and
   a detecting circuit section for recognizing information regarding said moving object in response to a light signal received via said other fiber.

2. A device according to claim 1, wherein said moving object to be monitored is a rotary disk.

3. A device for according to claim 1, wherein said light intercepting means is composed of a light reflecting plane and a light absorbing plane.

4. A device according to claim 1, wherein said light intercepting means has light transmitting slits formed at fixed intervals.

5. A device according to claim 1, wherein the end of an optical fiber is embedded in said retaining member, and the end of the fiber retained by said fiber head member is optically connected to the optical fiber embedded in said retaining member.

6. A device according to claim 5, wherein the plane of said retaining member secured to said housing and the end of the optical fiber embedded in said retaining member are accurately positioned with respect to said moving object to be monitored.

7. A device according to claim 5, wherein the plane of said retaining member to be attached to said housing and a plane in contact with an end of said fiber head member are accurately positioned with respect to said moving object to be monitored, the end of the fiber in the fiber head member being also accurately positioned with respect to a plane to be attached to an attaching member on the side of the fiber head member.

8. A device according to claim 1, wherein said light intercepting means of said moving object to be monitored faces the end of the fiber in a sensor head section which is attached in place to said retaining member.

9. An optical fiber type device for monitoring a moving object according to claim 1, wherein said retaining member and said sensor head section are made of a molded resin material.

10. A device according to claim 1, wherein said fiber head member is provided as a connector which may be detachably coupled to said retaining member.

11. A device for detecting a rotational position of an internal combustion engine, said device comprising:

a rotary body which is housed in a metallic container and driven by the internal combustion engine synchronously with the revolution of the internal combustion engine;

an optical fiber head section formed of a resin material and attached at a position on a wall of said container so as to face said rotary body, said optical fiber head including an optical fiber carrying light which is intercepted by light intercepting means arranged for rotation on said rotary body; and a detecting circuit which receives light via an optical fiber from said intercepting means so as to detect the number of revolutions of said rotary body;

wherein an attaching member is secured between said metallic container and said optical fiber head section, the thermal expansion coefficient of said attaching member being substantially the same as that of said resin material of said optical fiber head section.

12. A device according to claim 11, wherein said rotary body is a disk, and light from the optical fiber is irradiated onto the surface of said disk.

13. A device according to claim 12, wherein light reflecting planes and light absorbing planes, both of which are provided on said light intercepting means, are alternately formed at substantially equal intervals on the surface of said disk, and wherein the frequency of an interruptible light signal received from said disk is related to the number of revolutions of the internal combustion engine, whereas the number of the interruptible light signals is related to the rotation angles of a rotation shaft of the internal combustion engine.

14. A device according to claim 12, wherein said light intercepting means includes slits formed at substantially equal intervals on the surface of said disk, the optical fiber on a side where light is received being disposed in a position so as to face, across said disk, the optical fiber on a side where light is emitted, and wherein the frequency of the interruptible light signal received from said disk is related to the number of revolutions of the internal combustion engine, whereas the number of the interruptible light signals is related to the rotation angles of the rotation shaft of the internal combustion engine.

15. A device according to claim 11, wherein said rotary body is a cylindrical body, and light from said optical fibers is irradiated onto the side of said cylindrical body.

16. A device according to claim 15, wherein light reflecting planes and light absorbing planes, both of which are provided on said light intercepting means, are alternately formed at substantially equal intervals on the side of said cylindrical body, and wherein the frequency of the interruptible light signal received from said disk is related to the number of revolutions of the internal combustion engine, whereas the number of the interruptible light signals is related to the rotation angles of the rotation shaft of the internal combustion engine.

17. A device according to claim 15, wherein said light intercepting means includes slits formed at substantially equal intervals on the side of said cylindrical body, the optical fiber on a side where light is received being disposed in a position so as to face, across said cylindrical body, the optical fiber on a side where light is emitted, and wherein the frequency of the interruptible light signal received from said disk is related to the number of revolutions of the internal combustion engine, whereas the number of the interruptible light signals is related to the rotation angles of the rotation shaft of the internal combustion engine.

18. A device according to claim 11, wherein the end of the optical fiber is embedded in said attaching member, the end of the optical fiber in said optical fiber head section being optically connected to the end of the optical fiber on the side of said attaching member.

19. A device according to claim 11, wherein the end of the optical fiber head section secured to said attaching member faces said light intercepting means of said rotary body.

20. A device for detecting a rotational position of an internal combustion engine, using an optical fiber assembly used for an optical type device for monitoring a moving object, comprising:

at least one optical fiber;

a fiber head including not only a rigid resin portion in which one end of said optical fiber is embedded, but also fixing means for fixing said resin portion to a container which holds a moving object to be monitored;

an adaptor including a light emitting/receiving device disposed on the other end of said optical fiber; and a detecting circuit section coupled to said adaptor for recognizing information regarding the rotational position of the internal combustion engine in response to a light signal received via said optical fiber.

21. A device according to claim 20, wherein said adaptor not only includes a housing section for housing light emitting and light receiving elements, but also includes a connector disposed on the other end of said optical fiber, said housing section and connector being constructed so as to be detachably attached.

22. A device according to claim 20, wherein a path through which light goes back and forth is formed inside said one optical fiber, a fiber for feeding light and a fiber for leading a light signal being arranged between said optical fiber and said light emitting/receiving elements, the ends of said two fibers being disposed in parallel so as to face the end of said optical fiber, the other ends of said two fibers being disposed so as to face the light emitting/receiving elements.

* * * * *